United States Patent
Long

(10) Patent No.: US 7,725,653 B2
(45) Date of Patent: May 25, 2010

(54) METHOD FOR ENABLING A MEMORY AS A FUNCTION OF ESTIMATED POWER SOURCE CAPACITY

(75) Inventor: Matthew Long, Uxbridge, MA (US)

(73) Assignee: EMC Corporation, Hopkinton, MA (US)

( * ) Notice: Subject to any disclaimer, the term of this patent is extended or adjusted under 35 U.S.C. 154(b) by 184 days.

(21) Appl. No.: 11/478,029

(22) Filed: Jun. 29, 2006

(65) Prior Publication Data

US 2008/0005474 A1    Jan. 3, 2008

(51) Int. Cl.
 *G06F 12/00* (2006.01)
 *G06F 12/14* (2006.01)
(52) U.S. Cl. ............... 711/118; 711/154; 711/E12.091
(58) Field of Classification Search ............ None
 See application file for complete search history.

(56) References Cited

U.S. PATENT DOCUMENTS

| 5,167,024 | A | * | 11/1992 | Smith et al. | ........... 713/322 |
| 5,565,759 | A | * | 10/1996 | Dunstan | ........... 320/135 |
| 2004/0054851 | A1 | | 3/2004 | Acton et al. | |
| 2005/0071697 | A1 | | 3/2005 | Batchelor et al. | |

OTHER PUBLICATIONS

Paris Martin, Laura; PCT Written Opinion of the International Searching Authority; Apr. 3, 2008; pp. 1-5; European Patent Office.
Paris Martin, Laura; PCT International Search Report; Apr. 3, 2008; pp. 1-5; European Patent Office.

* cited by examiner

*Primary Examiner*—Reginald G Bragdon
*Assistant Examiner*—Eric Loonan

(57) ABSTRACT

Memory parameters are controlled. A power source capacity estimate is determined. Based on the power source capacity estimate, an amount of cache to enable is determined and is enabled.

18 Claims, 8 Drawing Sheets

METHOD FOR ENABLING A MEMORY AS A FUNCTION OF ESTIMATED POWER SOURCE CAPACITY

BACKGROUND

One conventional data storage system includes a storage processor, an array of magnetic disk drives and a backup power supply. The storage processor carries out a variety of data storage operations on behalf of an external host device (or simply host). In particular, the storage processor temporarily caches host data within its storage cache and, at certain times, de-stages that cached data onto the array of magnetic disk drives. If the data storage system is set up so that it acknowledges write requests from the host once the data reaches the storage cache rather than once the data reaches the array of magnetic disk drives, the host will enjoy shorter transaction latency.

Some data storage systems employ backup power supplies to prevent the loss of data from the storage caches in the event of power failures. For example, suppose that such a data storage system loses its steady state source of electrical power (e.g., power from the street) during operation. In such a situation, a set of backup power supplies provides reserve power to the storage processor and to a persistent storage device (e.g., the array of magnetic disk drives) for a short period of time (e.g., 30 seconds). During this time, the storage processor writes the data from its storage cache onto the persistent storage device so that any data which has not yet been properly de-staged is not lost. Once power from the main power feed returns, the storage processor loads the data from the persistent storage device back into the storage cache. At this point, the data storage system is capable of continuing normal operation.

Rechargeable batteries depend on a number of known cell types, including Ni-Cad, Ni-MH, and Li-Ion cells. All these cells are known to those of skill in the art, as are some of their deficiencies. One of the known deficiencies of the above mentioned rechargeable battery cells is related to the fact that each battery has a finite life span that can be measured in terms of recharge cycles. The process of charging and discharging the cell damages the cell's charge storage capabilities, causing the stored potential, which is typically measured in mA-hours, to decrease over the life of the battery. As the ability to store charge decreases, so does the battery's utility. The life of the battery can be drastically curtailed by improperly charging, or over discharging the battery. As a result of these deficiencies, it can be useful to be able to determine the capacity of a battery both prior to and during the usage.

One technique for battery capacity reporting relies on the coulomb counter. The principle of operation involved in coulomb counting is computing the difference between the coulombs injected into a battery and the coulombs taken out of the battery. The capacity of the battery is then reported by comparing the coulomb count relative to a reference coulomb count value that corresponds to maximum battery capacity. For instance, if the coulomb count of a battery is half of the reference value, the battery capacity is reported to be 50 percent.

Other known existing techniques of battery capacity reporting are primarily based on measuring battery voltage. Batteries have known characteristic charge and discharge curves. When the battery is in a charging state, a charge curve corresponding to the charging state is utilized. When the battery is in a discharging state, a discharge curve corresponding to the discharging state is utilized. The charge and discharge curves are such that given a battery voltage value and a charge curve or a discharge curve, it is possible to obtain a corresponding capacity value from the curves.

SUMMARY

Memory parameters are controlled. A power source capacity estimate is determined. Based on the power source capacity estimate, an amount of cache to enable is determined and is enabled.

One or more embodiments of the invention may provide one or more of the following advantages.

A data storage system can use a smaller and less expensive backup battery, and save on board space and cooling requirements on highly integrated systems. The performance of the data storage system can be improved more rapidly when power is restored after a power failure. In at least some cases, the data storage system's write cache can be enabled soon after any number of power failures, not just after a finite number.

BRIEF DESCRIPTION OF THE DRAWINGS

The foregoing and other features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
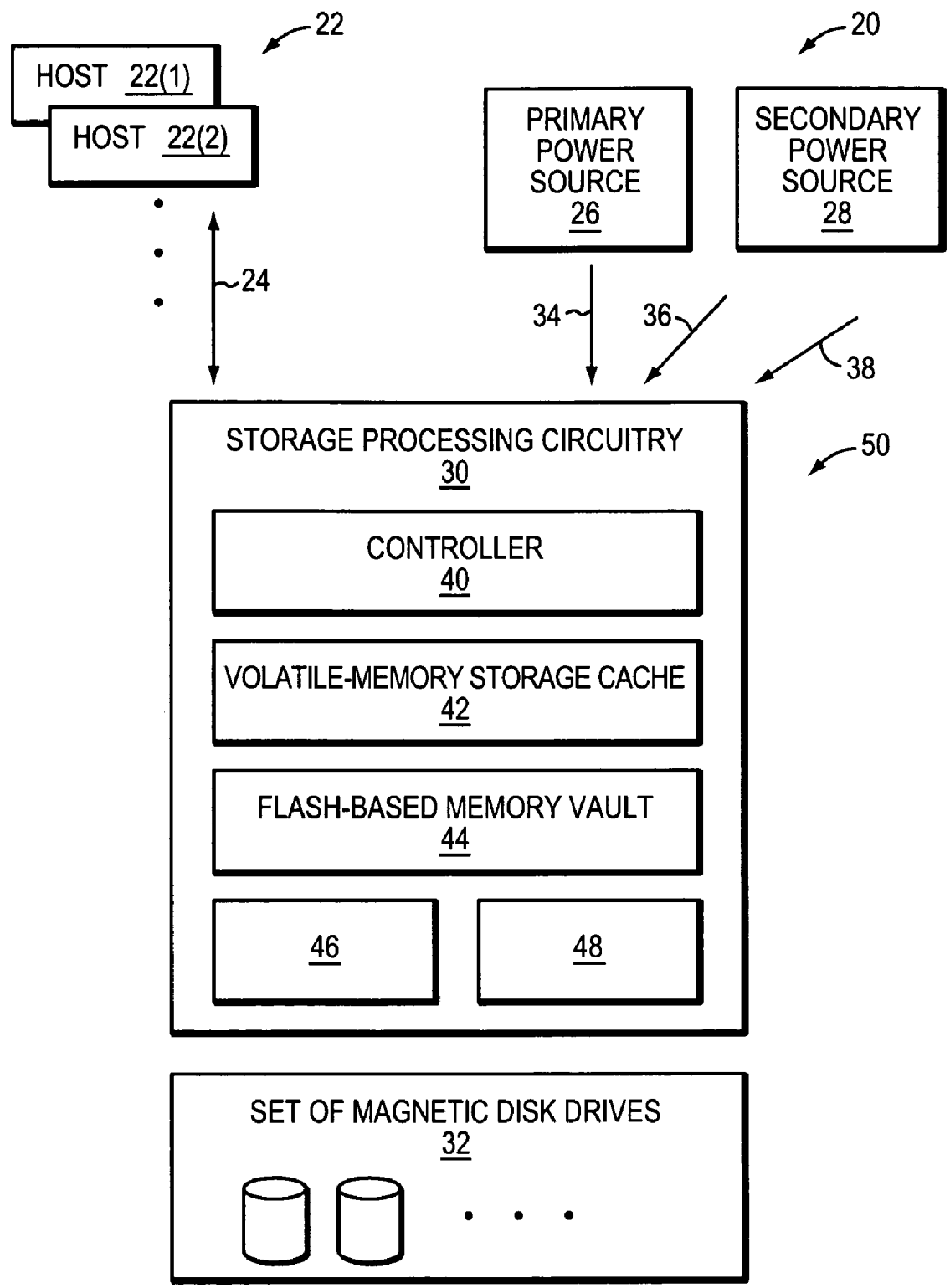
FIG. 1 is a block diagram of a data storage system which utilizes a flash-based memory vault.

As described below, one or more memory parameters may be controlled based on one or more characteristics of a backup power supply.

For example, in a data storage system having a write cache, write cache enablement can be graduated based on the charge level of a battery backup device.

A volatile (i.e., nonpersistent) memory based write cache is used in a data storage system to improve the performance of the system. If the data storage system loses its steady state source of electrical power (i.e., has a power failure), the data in the write cache is lost unless it is saved to a persistent storage device (e.g., a magnetic hard disk or a flash memory) before the data storage system is completely out of energy.

A data storage system may have a rechargeable battery based backup power system that can power the data storage system long enough to allow the data storage system save the write cache data to a persistent storage device. During such saving, the rechargeable battery in the backup power system is drained, and, depending on its energy capacity, may in fact be drained to nearly complete depletion. When the steady state source of electrical power is restored, the data storage system starts recharging the rechargeable battery, but conventionally the data storage system cannot re-enable the write cache until the rechargeable battery is nearly fully charged; otherwise in the event of another power failure, it is possible the rechargeable battery will not be able to power the system up long enough to allow write cache data to be saved.

The rechargeable battery may be sized large enough (i.e., have sufficient energy capacity) to allow write cache data to be saved through a specified number of multiple power failures in a short period of time. While this approach does allow the data storage system to re-enable the write cache immediately after a finite number of power failures, it does so at the cost of a larger, more expensive battery and associated hardware. The cost is raised if the time it takes to save the write cache data is increased and/or the data storage system is expected to allow write cache data to be saved through additional power failures. In addition, with this approach, after the specified number of power failures is exceeded, the write cache must remain disabled until the rechargeable battery is charged up again, which can take much longer than with a smaller battery, during which time (e.g., many hours) the data storage system operates with substantially reduced performance.

As a result of the cache enablement techniques described herein, at least some of the performance advantage of using a write cache can be achieved much sooner. In particular, in accordance with the techniques, the write cache is enabled before the battery is fully charged. In at least one implementation, the charge available in the battery is estimated and an amount of write cache to enable is selected based on the time it would take to save that amount of write cache data to a persistent device before the estimated charge would be depleted.

The techniques may be used in and/or with any data storage system having a write cache and a persistent storage device, e.g., in and/or with a data storage system as now described.

Data may be moved within a data storage system from a storage cache such as the write cache into a persistent storage device such as magnetic hard disk based device and/or a flash-based memory vault in response to a power failure signal. The data is moved from the storage cache to the persistent storage device using a backup power source. With the storage processor still running from the backup power source (e.g., an uninterruptible power supply (UPS) or a dedicated battery), the storage processor is capable of moving the contents of the storage cache to the persistent storage device thus preserving data integrity of the data storage system so that no data is ever lost.

FIG. 1 shows an example data storage system, namely system 20 which is configured to manage data behalf of a set of hosts 22(1), 22(2), ... (collectively, hosts 22). In particular, the data storage system 20 exchanges communications signals 24 with at least one host 22 to perform a variety of data storage operations (e.g., read, write, read-modify-write, etc.).

As shown in FIG. 1, the data storage system 20 includes a primary power source 26, a secondary power source 28, storage processing circuitry 30 and a set of magnetic disk drives 32 (i.e., one or more magnetic disk drives 32). The primary power source 26 (e.g., a set of power supplies which connects to an external main power feed) is configured to provide primary power 34 to the storage processing circuitry 30 under normal conditions. The secondary power source 28 (e.g., a set of batteries) is configured to provide backup power 36 to the storage processing circuitry 30 in the event of a loss of primary power 34.

As further shown in FIG. 1, the storage processing circuitry 30 is configured to receive a power failure signal 38 which indicates whether the storage processing circuitry 30 is running off of primary power 34 or backup power 36. In some arrangements, the power failure signal 38 is a power supply signal from the primary power source 26 or from the secondary power source 28. In other arrangements, the power failure signal 38 is a separate signal, e.g., from a sensor connected to the main power feed.

The storage processing circuitry 30 includes a controller 40, a volatile (i.e., not persistent) memory storage cache 42 (a data storage cache between 100 MB to 1 GB), a vault 44 (e.g., hard disk memory or flash-based memory or static RAM having its own battery), a clock generator circuit 46, and isolation circuitry 48. (As described below and shown in FIG. 3, system 20 also includes a capacity determiner 314 and cache control logic 310.)

While the controller 40 is being powered by the primary power source 28, the controller 40 performs data storage operations on behalf of the set of hosts 22 using the volatile-memory storage cache 42 and the set of magnetic disk drives 32. For example, when a host 22 sends the controller 40 a request to write data, the controller 40 stores the data in volatile memory 42 and then, in parallel to scheduling the data to be written to the magnetic disk drives 32, conveys the completion of the write data request to the host 22. As a result, the write request completes to the host 22 as soon as the data is written to the volatile-memory storage cache 42 which takes less time than writing the magnetic disk drives 32.

Now, suppose that the controller 40 receives the power failure signal 38 indicating that the controller 40 is now being powered by the secondary power source 28 rather than by the primary power source 26. In this situation, primary power 34 from the primary power source 26 is no longer available but backup power 36 from the secondary power source 28 is available at least temporarily. Accordingly, the controller 40 remains operational and moves data from the volatile-memory storage cache 42 to the vault 44 in response to the power failure signal 38.

The technique described herein may be applied to any version of backup power 36 that allows the amount of energy stored therein to be estimated. For example, backup power 36 may include one or more of any of the following: a chemical battery, a battery based UPS, a gasoline powered generator, a fuel cell, a capacitor, a radioisotope thermoelectric generator, a spring, a flywheel, and/or a thermal battery, pneumatic, hydraulic, and/or magnetic battery.

The amount of power necessary from backup power 36 to allow enough time for the data to be moved from the volatile-memory storage cache 42 to vault 44 depends on the way in which vault 44 is implemented. For example, the amount of power necessary to move the data from the volatile-memory storage cache 42 to a flash-based vault is significantly less than that which would be required to write that data out to a vault on the set of magnetic disk drives 32 since flash-based memory (which has no motors or actuators to operate) requires relatively little power to store data.

When the primary power source 26 becomes available again, the storage processing circuitry 30 receives primary power 34 and no longer receives the power failure signal 38. In some arrangements, the omission of the power failure signal 38 (or the de-asserted state of the power failure signal 38) is essentially a power normal signal indicating that the storage processing circuitry 30 is running off of primary power 34. At this point, depending on how much of volatile-memory storage cache 42 is enabled, the controller 40 can restore the contents of cache 42.

Figure 2:
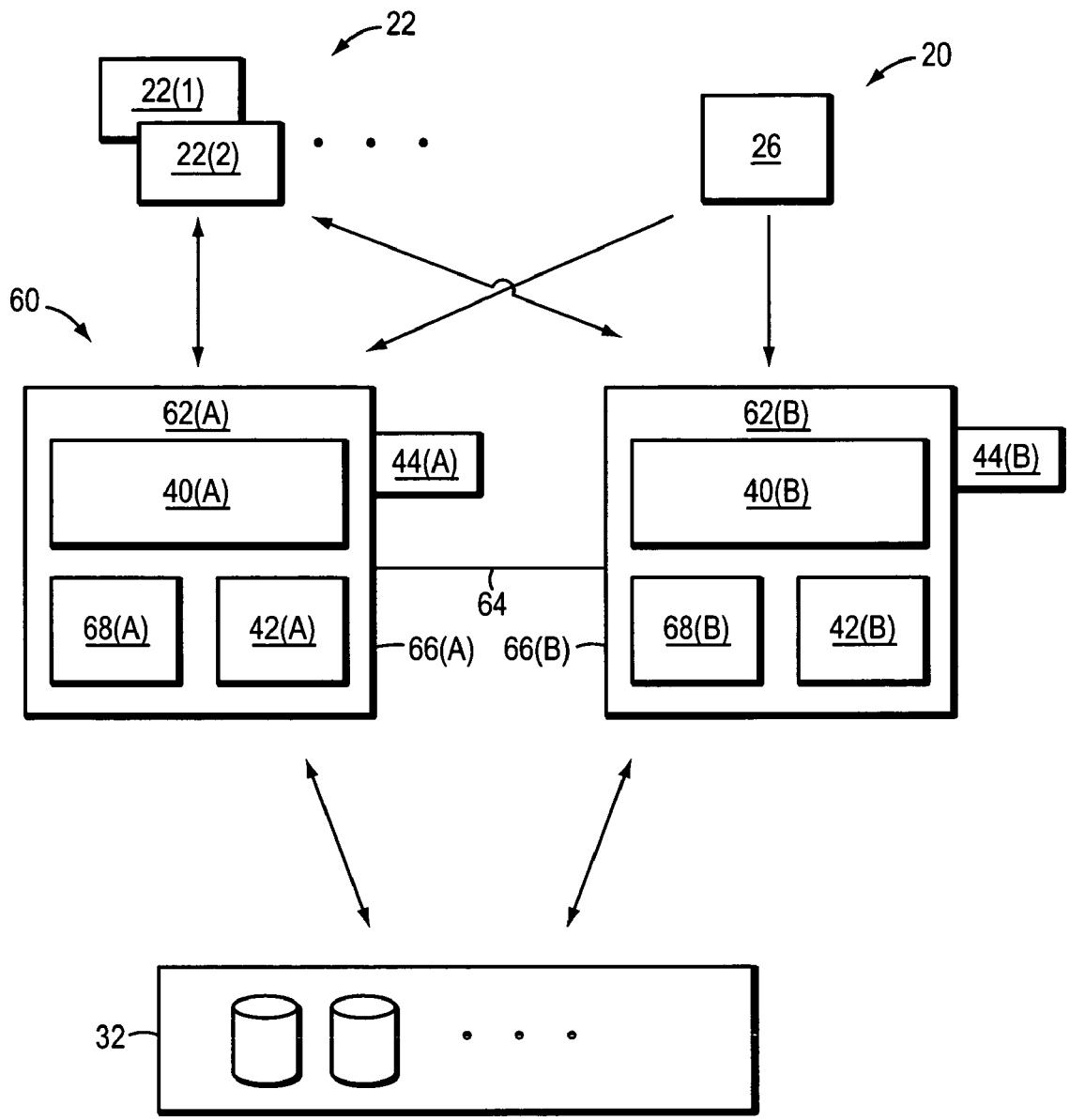
FIG. 2 is a diagram of the data storage system of FIG. 1 in a multiple storage processor context.

FIG. 2 is a diagram of another example data storage system, namely, system 20 in the context of a dual storage processor configuration 60. Here, the data storage system 20 includes a first storage processor 62(A), a second storage processor 62(B) and a high-speed bus 64 which interconnects the first and second storage processors 62(A), 62(B) (collectively, storage processors 62). The storage processor 62(A) includes, among other things, an enclosure 66(A) which contains a controller 40(A), a volatile-memory storage cache 42(A), and a memory vault 44(A). Within the enclosure 66(A) also resides a battery 68(A) which forms a portion of the secondary power source 28 (also see FIG. 1). Similarly, the storage processor 62(B) includes, among other things, an enclosure 66(B) which contains a controller 40(B), a volatile-memory storage cache 42(B), and a memory vault 44(B). Within the enclosure 66(B) also resides a battery 68(B) which forms another portion of the secondary power source 28 (again, also see FIG. 1). The vaults 44(A), 44(B) can be viewed as forming the vault 44 of FIG. 1.

Figure 4:
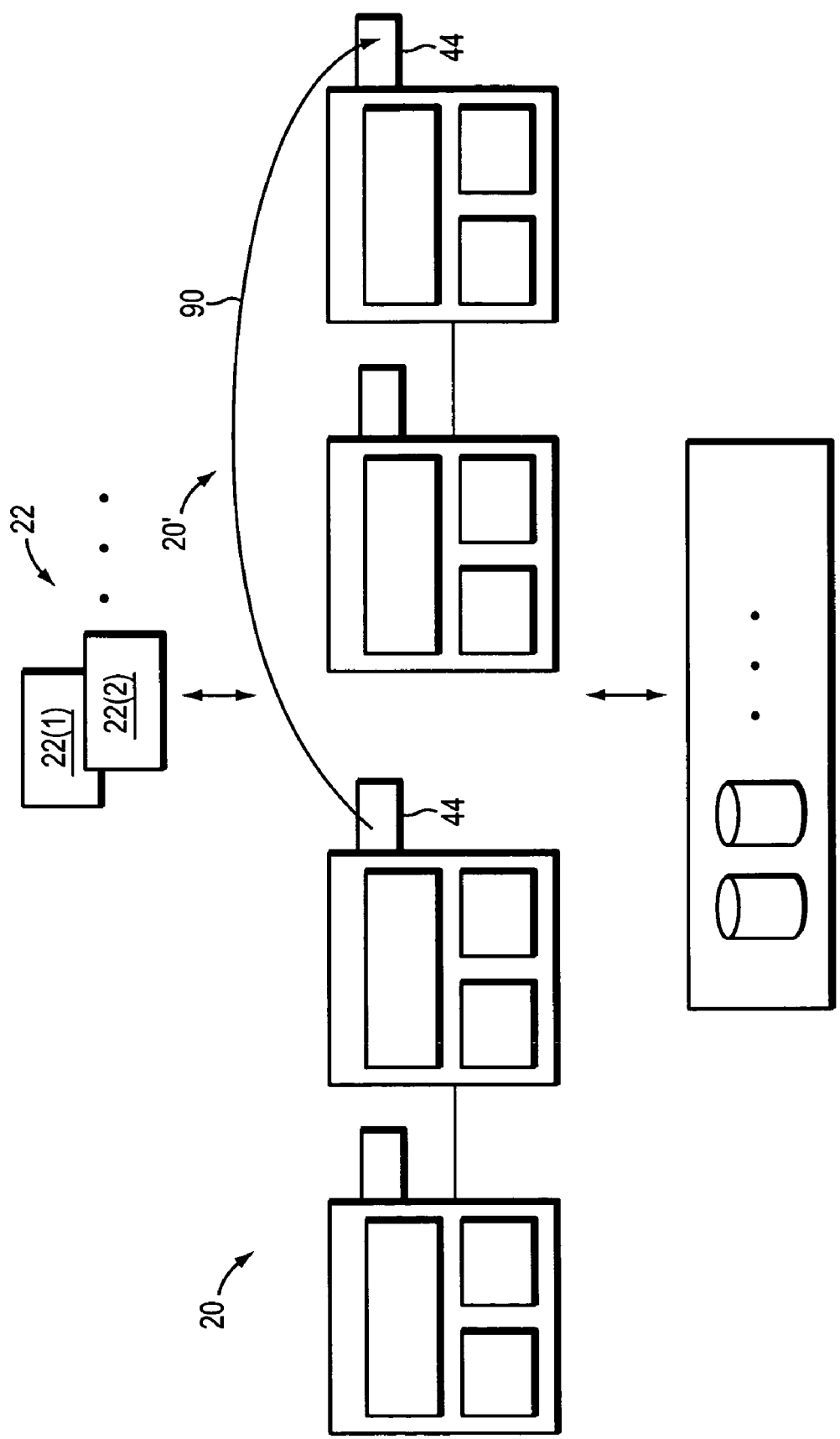
FIG. 4 is a block diagram illustrating a particular use of the flash-based memory vault of FIG. 2.

FIG. 4 illustrates an example recovery procedure that may be accomplished through use of a removable nonvolatile vault 44. In particular, in some arrangements, the vault 44 is configured as a removable module (e.g., an external hard disk or a flash-based memory stick) that conveniently connects to and disconnects from other portions of the data storage system 20 through module connectors. In the event of a hardware failure after safely storing the contents of the volatile-memory storage cache 42 into the vault 44, the vault 44 is then capable of being disconnected from the data storage system 20 and connected to new storage processing hardware (e.g., a new data storage system 20' or the same data storage system, after being repaired), as generally shown by the arrow 90 in FIG. 4.

Figure 3:
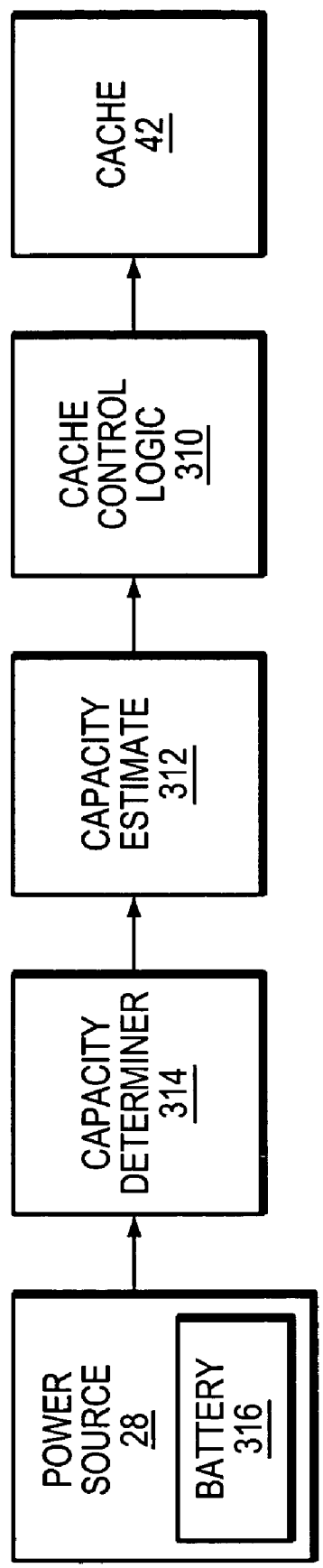
FIG. 3 is a block diagram of further aspects of the data storage system of FIG. 1.

With respect to the system 20 of FIG. 1, FIG. 3 illustrates a relationship among cache control logic 310, secondary power source 28, and cache 42. In particular, a power capacity determiner 314 produces a capacity estimate 312 for source 28, which cache control logic 310 uses to determine how much of cache 42 to enable.

In a particular implementation, source 28 has a rechargeable battery 316 (which may be or include multiple batteries or battery cells), for which capacity determiner 314 produces capacity estimate 312, which cache control logic 310 uses to determine how much of cache 42 to enable. Determiner 314 may be, include, or be included in a battery controller. Battery 316 may be or include one or both of batteries 68(A), 68(B) described above.

For example, source 28 may be sized to be able, at 100% capacity, to supply power long enough to allow 100% of cache 42 to be saved. In such a case, if capacity estimate 312 indicates that source 28 is at 60% capacity, logic 310 may determine that therefore 60% of cache 42 should be enabled.

In another example, source 28 may be sized to be able, at 50% capacity, to supply power long enough to allow 100% of cache 42 to be saved. In such a case, if capacity estimate 312 indicates that source 28 is at least at 50% capacity, logic 310 may determine that therefore 100% of cache 42 should be enabled.

In at least some implementations, more and more of cache 42 is enabled as the capacity of source 28 increases (e.g., because battery 316 is charging up). In at least some implementations, the enabling of more of cache 42 can be performed on the fly while the data storage system is running, i.e., without stopping the data storage system or the storage processor.

Figure 5:
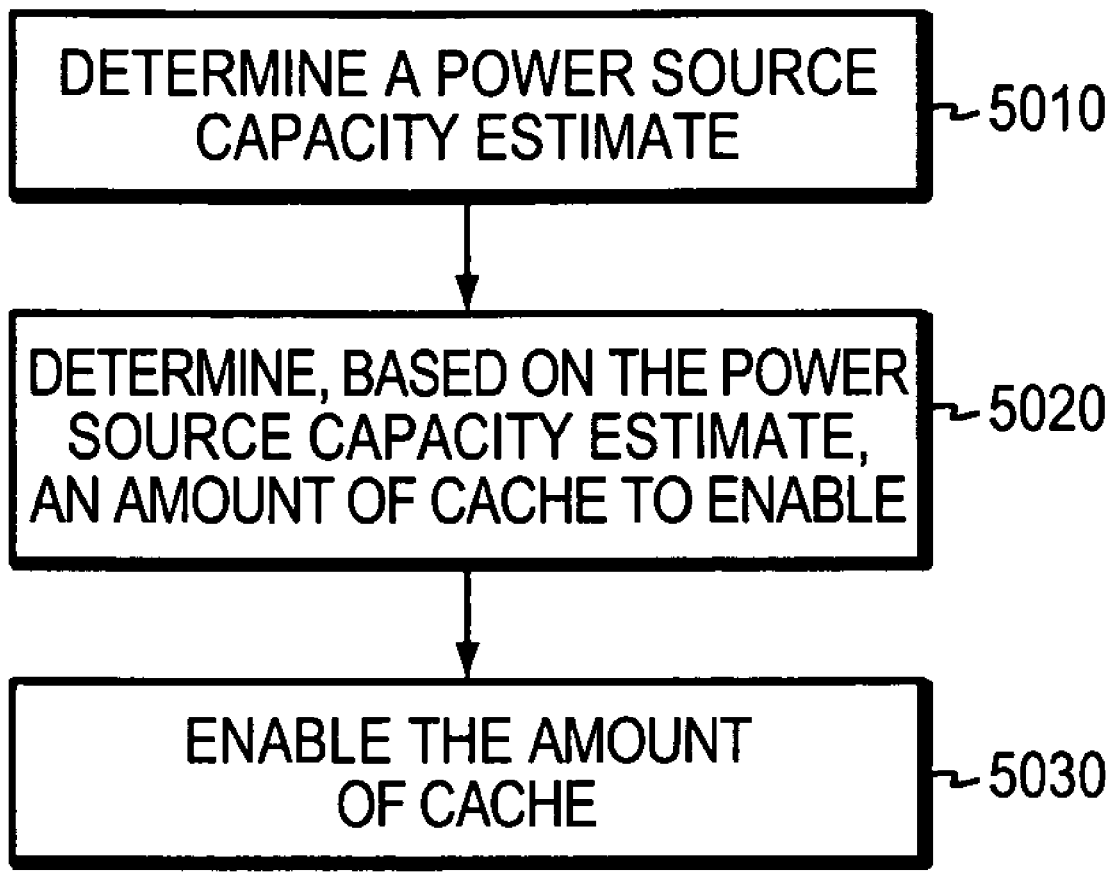
FIGS. 5-8 are flow diagrams of procedures that may be used with the data storage system of FIG. 1.

FIG. 5 illustrates a procedure in accordance with the techniques described herein. A power source capacity estimate is determined (step 5010). An amount of cache to enable is determined based on the power source capacity estimate (step 5020). The amount of cache is enabled (step 5030).

Figure 6:
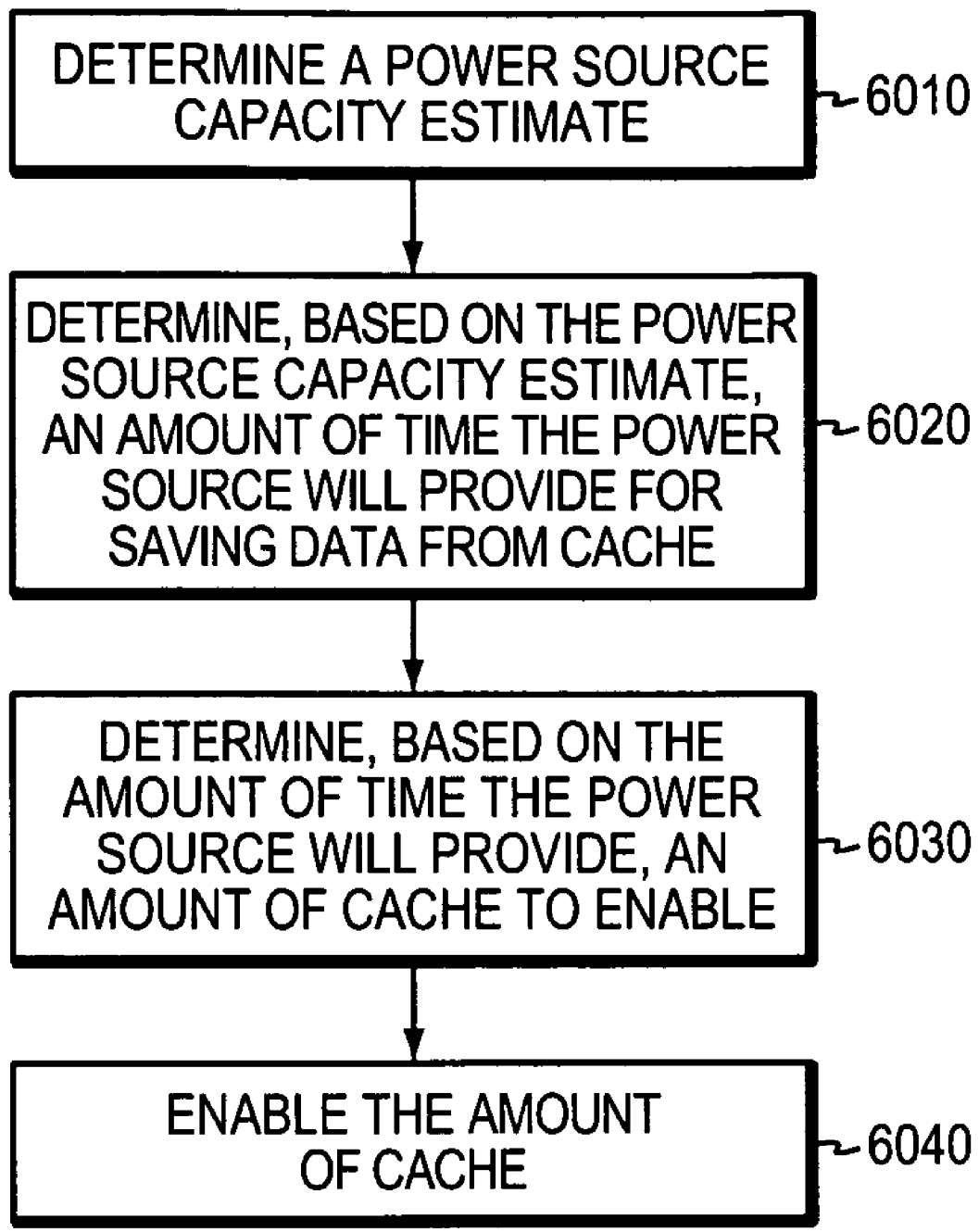

FIG. 6 illustrates a procedure of a specific implementation in accordance with the techniques described herein. A power source capacity estimate is determined (step 6010). An amount of time the power source will provide for saving data from the cache is determined based on the power source capacity estimate (step 6020). An amount of cache to enable is determined based on the amount of time the power source will provide (step 6030). The amount of cache is enabled (step 6040).

Figure 7:
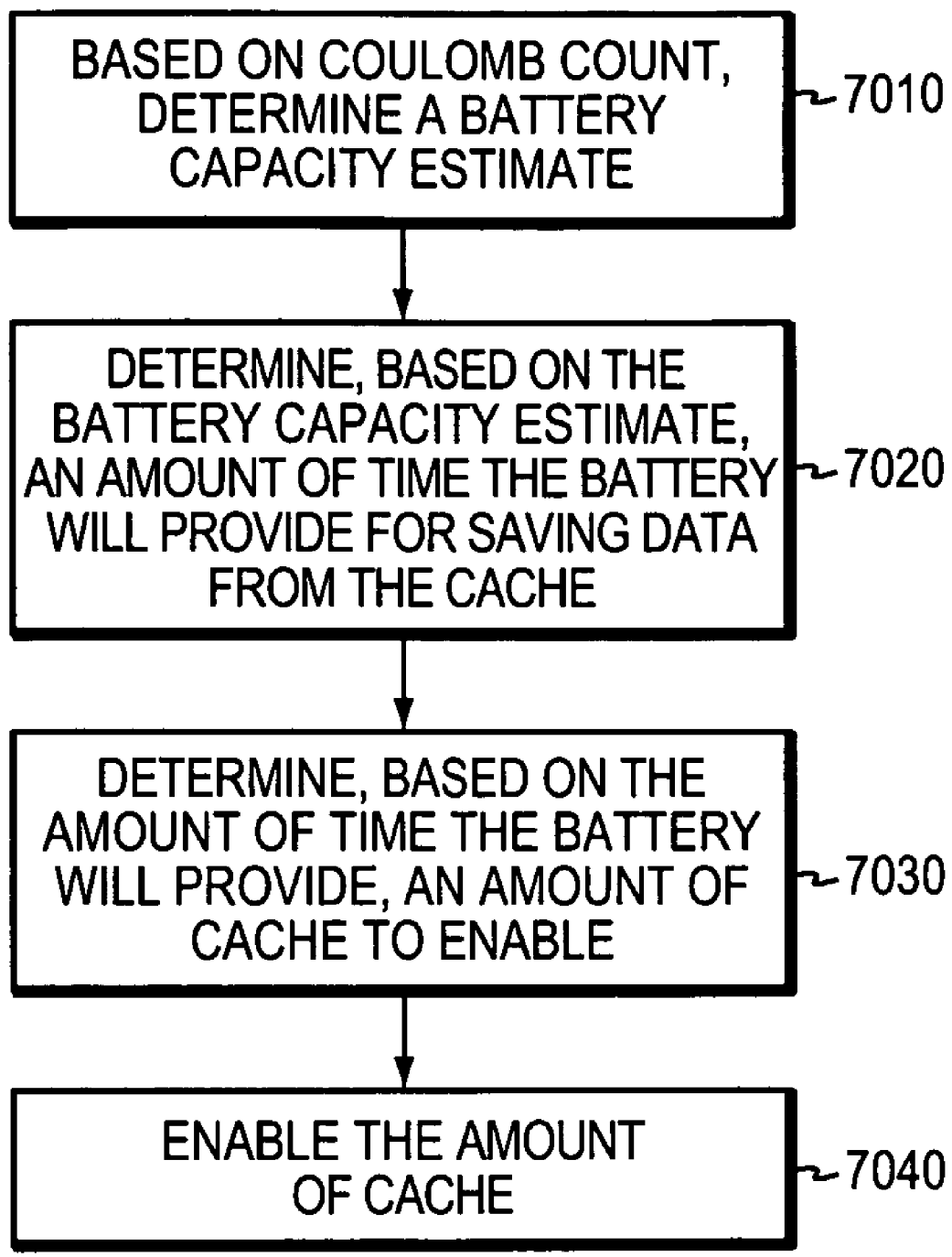

FIG. 7 illustrates a procedure of a specific implementation in accordance with the techniques described herein. A battery capacity estimate is determined based on a coulomb count (step 7010). An amount of time the battery will provide for saving data from the cache is determined based on the battery capacity estimate (step 7020). An amount of cache to enable is determined based on the amount of time the battery will provide (step 7030). The amount of cache is enabled (step 7040).

Figure 8:
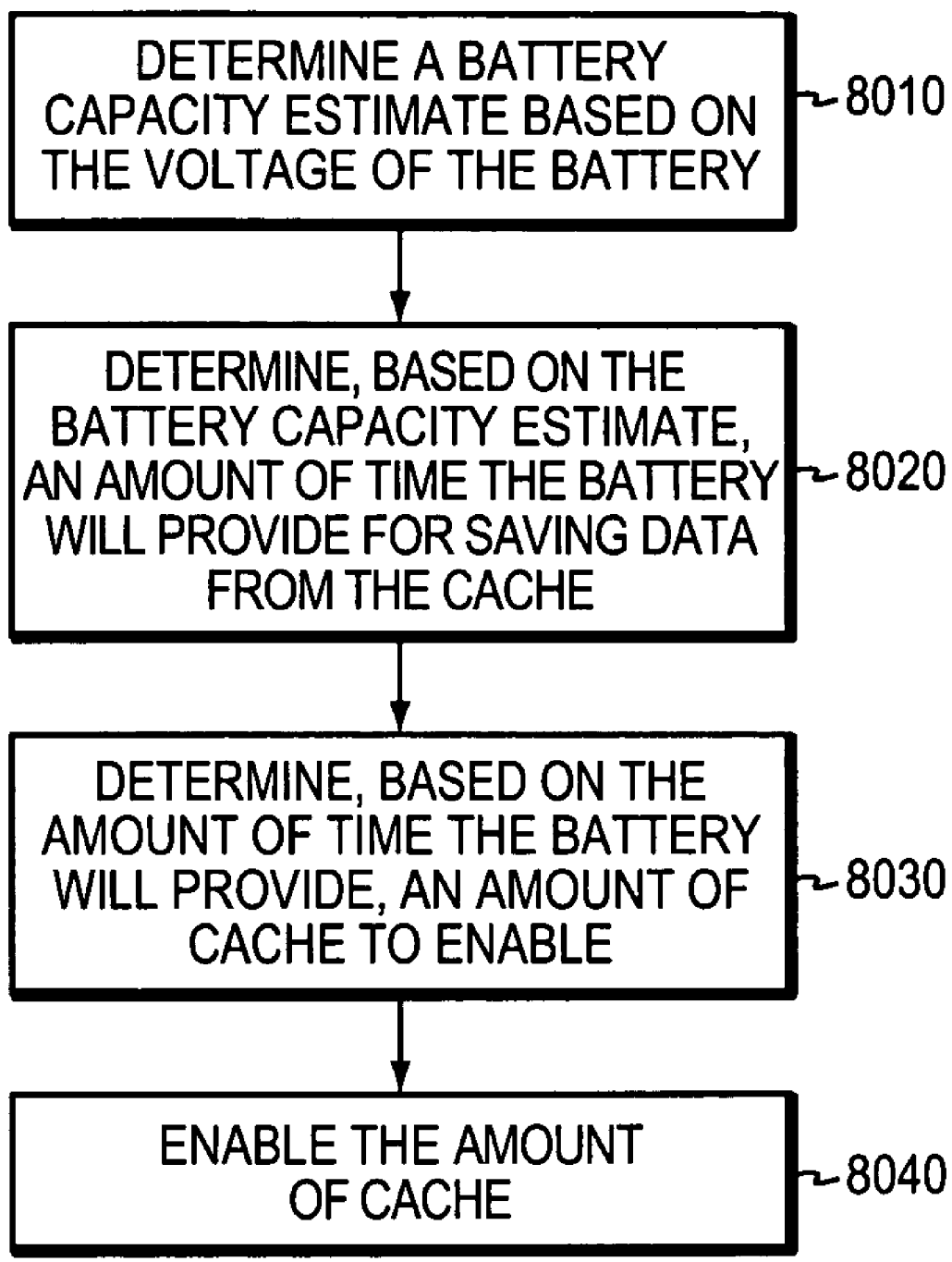

FIG. 8 illustrates a procedure of a specific implementation in accordance with the techniques described herein. A battery capacity estimate is determined based on the voltage of the battery (step 8010). An amount of time the battery will provide for saving data from the cache is determined based on the battery capacity estimate (step 8020). An amount of cache to enable is determined based on the amount of time the battery will provide (step 8030). The amount of cache is enabled (step 8040).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for use in a system having a primary power source, a rechargeable back-up power source, and a cache memory comprising:
    applying the primary source to the system including the rechargeable back-up power source to feed charge to the rechargeable back-up power source;
    determining a power capacity estimate of the rechargeable back-up power source during the feeding of the charge to the rechargeable back-up power source;
    determining, based on the power capacity estimate, an amount of cache memory available for storage of data; and
    enabling writing of such data up to the determined amount of cache memory available for storage of data into the cache memory.

2. The method of claim 1, further comprising:
    enabling the amount of cache before the back-up power source is at full capacity.

3. The method of claim 1, further comprising:
    further basing the amount of cache to enable on the time it would take to save data from that amount of cache to a persistent device before the back-up power source capacity would be depleted.

4. The method of claim 1, further comprising:
    copying data from the cache into a persistent storage device using the back-up power source.

5. The method of claim 1, wherein the back-up power source capacity estimate is for a chemical battery.

6. The method of claim 1, wherein the back-up power source capacity estimate is for a battery based UPS.

7. The method of claim 1, further comprising:
    further basing the amount of cache to enable on a way in which persistent storage is implemented.

8. The method of claim 1, further comprising:
using a battery controller to determine the back-up power source capacity estimate.

9. The method of claim 1, further comprising:
if the back-up power source capacity estimate indicates that back-up power source capacity is at 100%, enabling 100% of cache.

10. The method of claim 1, further comprising:
if the back-up power source capacity estimate indicates that back-up power source capacity is less than 100%, enabling less than 100% of cache.

11. The method of claim 1, further comprising:
enabling more cache as back-up power source capacity increases.

12. A method for use in a data storage system having a primary power source and a rechargeable back-up power source, comprising a volatile-memory storage cache and a controller coupled to the volatile-memory storage cache, the method comprising:
applying the primary source to the system including the rechargeable back-up power source to feed charge to the rechargeable back-up power source;
determining a power source capacity estimate of the rechargeable back-up power source during the feeding of the charge to the rechargeable back-up power source;
determining, based on the power source capacity estimate, an amount of the volatile-memory storage cache available for storage of data; and
using the controller to enable writing of such data up to the determined amount of data into the cache.

13. A system, comprising:
a primary power source;
a rechargeable back-up power source;
a cache;
first logic determining a back-up power source capacity estimate of the rechargeable back-up power source during the feeding of the charge to the rechargeable back-up power source after applying a primary source to the rechargeable back-up power source;
second logic determining, based on the back-up power source capacity estimate, an amount of cache available for data to be written into such cache; and
third logic enabling writing of such data into the cache up to the determined amount of cache data.

14. The system of claim 13, further comprising:
fourth logic enabling the amount of cache before the back-up power source is at full capacity.

15. The system of claim 13, further comprising:
fourth logic further basing the amount of cache to enable on the time it would take to save data from that amount of cache to a persistent device before the back-up power source capacity would be depleted.

16. The system of claim 13, further comprising:
fourth logic copying data from the cache into a persistent storage device using the back-up power source.

17. The system of claim 13, wherein the back-up power source capacity estimate is for a chemical battery.

18. The system of claim 13, wherein the back-up power source capacity estimate is for a battery based UPS.

* * * * *